(12) United States Patent
Holler

(10) Patent No.: US 6,789,346 B1
(45) Date of Patent: Sep. 14, 2004

(54) HUNTING HARPOON AND ASSOCIATED METHODS

(76) Inventor: Christopher A. Holler, 2449 Via Sienna Ave., Winter Park, FL (US) 32789

( * ) Notice: Subject to any disclaimer, the term of this patent is extended or adjusted under 35 U.S.C. 154(b) by 26 days.

(21) Appl. No.: 10/402,448

(22) Filed: Mar. 28, 2003

(51) Int. Cl.$^7$ ............................................. A01K 81/04
(52) U.S. Cl. ........................................................ 43/6
(58) Field of Search ........................... 43/5, 6; 294/126; 473/564

(56) References Cited

U.S. PATENT DOCUMENTS

| | | | | |
|---|---|---|---|---|
| 21,949 A | * | 11/1858 | Doyle | 43/6 |
| 126,388 A | * | 5/1872 | Freeman | 43/6 |
| 206,694 A | * | 8/1878 | Taylor | 43/6 |
| 1,072,172 A | * | 9/1913 | Schell | 43/6 |
| 1,302,457 A | * | 4/1919 | Ureck | 43/5 |
| 1,344,693 A | * | 6/1920 | Hinsdale | 43/6 |
| 1,498,741 A | * | 6/1924 | Loop | 43/6 |
| 1,536,494 A | | 5/1925 | Henkes | 102/371 |
| 1,581,321 A | * | 4/1926 | Raithel | 43/6 |
| 2,236,427 A | * | 3/1941 | Garrison | 43/6 |
| 2,289,284 A | | 7/1942 | Chandler | 473/584 |
| 2,353,662 A | * | 7/1944 | Goldman | 43/6 |
| 2,522,060 A | | 9/1950 | Ridland | 124/22 |
| 2,659,273 A | * | 11/1953 | Trautmann | 43/6 |
| 2,667,814 A | * | 2/1954 | Blackmon | 43/6 |
| 2,770,905 A | * | 11/1956 | Efraimson | 43/6 |
| 2,784,712 A | | 3/1957 | Cassidy | 43/6 |
| 2,796,691 A | | 6/1957 | Norris | 43/6 |
| 3,004,362 A | * | 10/1961 | Day | 43/6 |
| 3,036,395 A | * | 5/1962 | Nelson | 43/6 |
| 3,036,396 A | * | 5/1962 | Swails | 43/6 |
| 3,072,428 A | * | 1/1963 | Johnson | 43/6 |
| 3,150,460 A | * | 9/1964 | Dees | 43/6 |
| 3,423,781 A | * | 1/1969 | Henson | 403/349 |
| 3,456,376 A | * | 7/1969 | Chappell | 43/6 |
| 3,486,265 A | * | 12/1969 | Cheesebrew | 43/6 |
| 3,532,375 A | * | 10/1970 | Heartness | 43/6 |
| 4,169,330 A | * | 10/1979 | Schnur | 43/5 |
| 4,307,699 A | | 12/1981 | Cuesta | 124/22 |
| 4,518,162 A | * | 5/1985 | Oates | 403/349 |
| 4,624,068 A | * | 11/1986 | Howard, III | 43/6 |
| 4,839,979 A | * | 6/1989 | Rogers | 43/6 |
| 4,854,067 A | | 8/1989 | Tersiev et al. | 43/6 |
| 4,896,450 A | * | 1/1990 | Rogers | 43/6 |
| 5,033,220 A | * | 7/1991 | Phelps | 43/6 |
| 5,094,463 A | | 3/1992 | Dryden | 273/416 |
| 5,094,464 A | * | 3/1992 | Musacchia, Sr. | 43/6 |
| 5,119,579 A | * | 6/1992 | Hullihen et al. | 43/6 |

(List continued on next page.)

FOREIGN PATENT DOCUMENTS

| | | | | |
|---|---|---|---|---|
| AU | 26864 B1 | * | 5/1930 | 43/6 |
| IT | 411731 B1 | * | 6/1945 | 43/6 |
| IT | 412037 B1 | * | 9/1945 | 43/6 |
| IT | 582637 B1 | * | 9/1958 | 43/6 |
| JP | 5-115233 B1 | * | 5/1993 | |
| JP | 2002-360122 B1 | * | 12/2002 | |
| NO | 61185 B1 | * | 7/1939 | 43/6 |

*Primary Examiner*—Darren W. Ark
(74) *Attorney, Agent, or Firm*—The Torpy Group

(57) ABSTRACT

A harpoon includes a handle to be grasped by a user for placing the harpoon and a shaft having a proximal end connected to the handle. A distal end of the shaft has a pin receiving passageway formed therein. The pin receiving passageway may include a releasing portion and a retaining portion in communication therewith. The manual harpoon may also include a harpoon tip having an open proximal end for being received over the distal end of the shaft, and a pin carried by the open proximal end of the harpoon tip. The pin may cooperate with the pin receiving passageway to retain the harpoon tip on the shaft when the pin is in the retaining portion of the pin receiving passageway, and to release the harpoon tip from the shaft when the pin is in the releasing portion of the pin receiving passageway.

24 Claims, 3 Drawing Sheets

U.S. PATENT DOCUMENTS

| | | | | |
|---|---|---|---|---|
| 5,243,778 A | * | 9/1993 | Henley | 43/6 |
| 5,335,439 A | | 8/1994 | Horton | 43/6 |
| 5,480,108 A | | 1/1996 | Amiand et al. | 244/115 |
| 5,570,530 A | * | 11/1996 | Lee | 43/6 |
| 5,811,713 A | | 9/1998 | Gudgel | 89/1.34 |
| 6,055,761 A | | 5/2000 | Chaprales | 43/6 |
| 6,311,623 B1 | | 11/2001 | Zaruba | 102/371 |
| 6,550,178 B1 | * | 4/2003 | Rogers | 43/6 |

\* cited by examiner

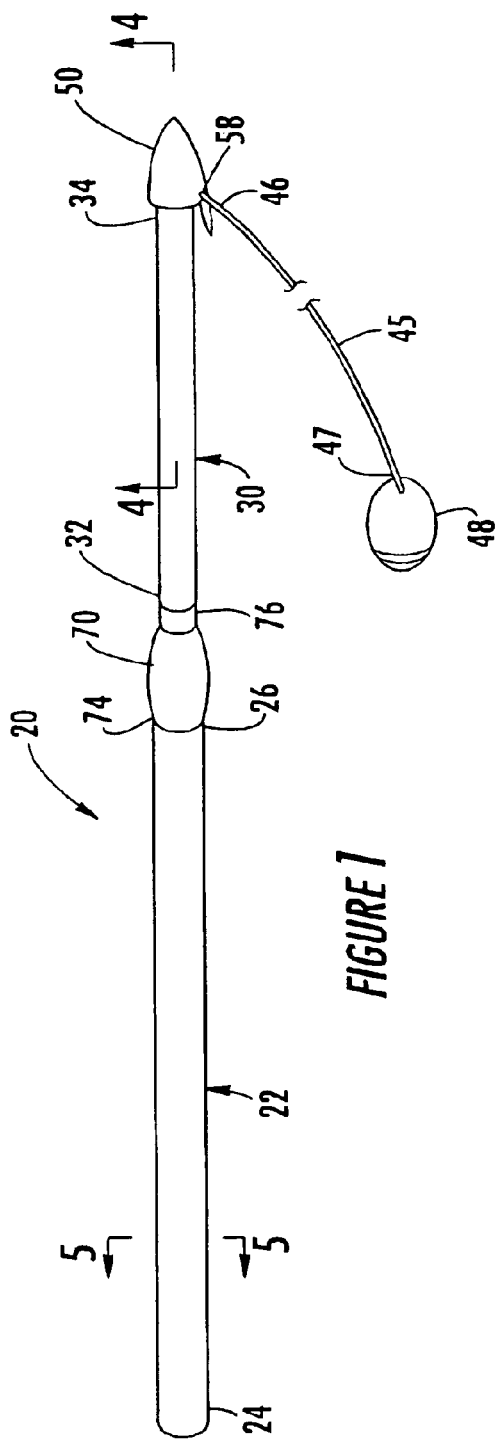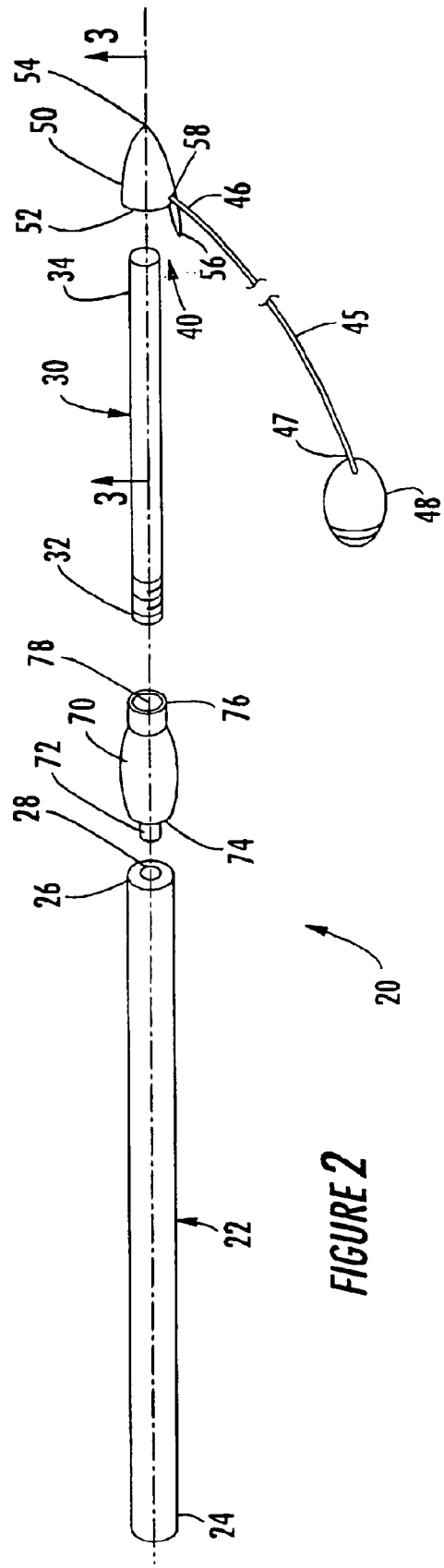

HUNTING HARPOON AND ASSOCIATED METHODS

FIELD OF THE INVENTION

The present invention relates to the field of hunting tools and, more particularly, to the field of hunting harpoons and associated methods.

BACKGROUND OF THE INVENTION

Harpoons have been used to hunt various fish and game, such as alligators, for example. When hunting game, such as an alligator, a harpoon tip on an end of a shaft is typically used to penetrate the hide of the alligator and attach a harpoon line thereto. A conventional harpoon includes a wooden handle, a shaft connected thereto, and a detachable harpoon tip that may be held in place with rubber bands. These types of harpoons, however, are heavy, may be quite cumbersome, and may be difficult to use. Wooden handles are also easily broken when hunting wild, and sometimes aggressive, animals, such as alligators. Another problem with these harpoons is that it may be difficult to release the harpoon tip into the animal.

U.S. Pat. No. 2,796,691 to Norris discloses a harpoon including a harpoon tip that is releasably retained on a shaft by a magnet. Upon impact with a target, a collar adjacent the shaft releases the harpoon tip from the magnet so that the harpoon tip is released from the shaft and remains within the target. This harpoon, however, may not be reliable in retaining and/or releasing the harpoon tip.

A fish tag harpoon for tagging fish with a sonic tracking tag is disclosed in U.S. Pat. No. 6,055,761 to Chaprales. This harpoon includes a shaft that is held in a sleeve, a dart on the end of the shaft, and a line connecting the sonic tracking tag to the dart. The line is held to the dart using a rubber band. Rubber bands to connect the line to the dart may, however, be unreliable. Further, the dart merely rests within the sleeve and is retained therein by a rearward pressure caused by the line which is connected to the dart by rubber bands. Again, the use of rubber bands to retain the dart in the sleeve may be unreliable.

SUMMARY OF THE INVENTION

In view of the foregoing background, it is therefore an object of the present invention to provide a harpoon and associated methods that are reliable, easy to assemble and use, light in weight, and reusable.

These and other objects, features and advantages of the present invention are provided by a harpoon having a harpoon tip that is releasable into a target. More specifically, the harpoon may comprise a handle to be grasped by a user, and a shaft having a proximal end connected to the handle and a distal end having a pin receiving passageway formed therein. The pin receiving passageway may include a releasing portion and a retaining portion in communication therewith, and may have a hook shape, for example.

The harpoon may also include a harpoon tip having an open proximal end for being received over the distal end of the shaft, and a pin carried by the open proximal end of the harpoon tip. The pin may cooperate with the pin receiving passageway to retain the harpoon tip on the shaft when the pin is in the retaining portion of the pin receiving passageway. The pin may also cooperate with the pin receiving passageway to release the harpoon tip from the shaft when the pin is in the releasing portion of the pin receiving passageway. Accordingly, the harpoon tip may advantageously be readily retained and released from the shaft.

The harpoon may further comprise a spring mounting the pin in the open proximal end of the harpoon tip. The spring may be a coil spring having an axis aligned with an axis of the open proximal end of the harpoon tip. The pin may extend transversely through a medial portion of the coil spring. Accordingly, the spring advantageously allows the pin to be moved within the harpoon tip to cooperate with the pin receiving passageway. The spring also advantageously provides sufficient force to retain the harpoon tip on the shaft by keeping the pin in communication with the retaining portion of the pin receiving passageway.

The harpoon may also comprise a connector for connecting the handle to the shaft. In some embodiments, the connector may be a threaded connector, and the proximal end of the shaft may be threaded to receive the threaded connector.

The harpoon tip may comprise a distal sharpened end and a proximal sharpened barb extending rearwardly therefrom. The harpoon tip may also have an opening therein, and the harpoon may include a harpoon line having a first end connected to the opening. A buoy may be connected to a second end of the harpoon line.

The handle may comprise an aluminum tube and foam material therein, for example. The shaft and harpoon tip may each comprise stainless steel, for example.

A method aspect of the present invention is for using a harpoon. The method may include positioning an open proximal end of a harpoon tip over a distal end of the shaft. The method may also include retaining the harpoon tip on the shaft using a pin in a retaining portion of a pin receiving passageway, and releasing the harpoon tip from the shaft when the pin is in a releasing portion of the pin receiving passageway.

BRIEF DESCRIPTION OF THE DRAWINGS

FIG. 1 is a side elevational view of a manual harpoon according to the present invention.

FIG. 2 is an exploded side elevational view of the manual harpoon shown in FIG. 1.

DETAILED DESCRIPTION OF THE PREFERRED EMBODIMENTS

Figure 4:
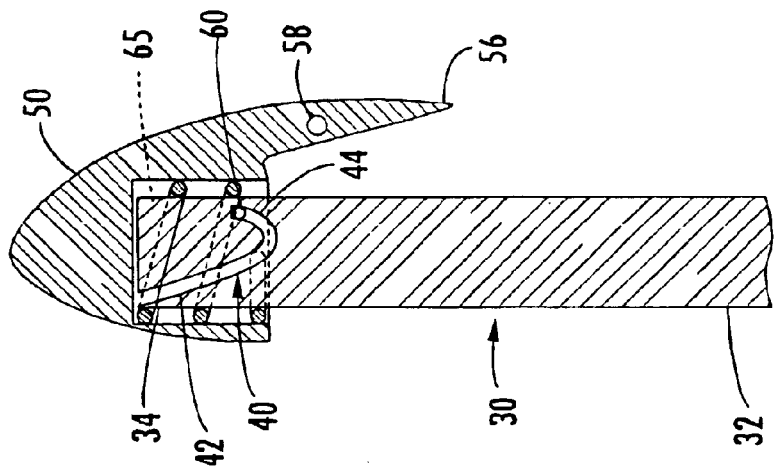
FIG. 4 is a cross-sectional view taken through line 4—4 of FIG. 1.
Figure 5:
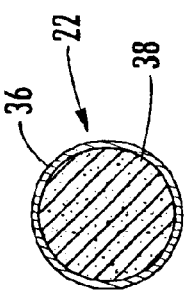
FIG. 5 is a transverse cross-sectional view taken through line 5—5 of FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring to FIGS. 1–5, a manual harpoon 20 according to the present invention is now described. The manual harpoon 20 illustratively includes a handle 22 to be grasped by a user for placing the manual harpoon. The manual harpoon 20 is typically operated by a user when hunting fish and game, such as alligator, for example.

The manual harpoon 20 also illustratively includes a shaft 30 having a proximal end 32 connected to a distal end 26 of the handle 22. A pin receiving passageway 40 is formed in a distal end 34 of the shaft 30. The pin receiving passageway 40 illustratively includes a releasing portion 42 and a retaining portion 44 in communication therewith. In the illustrated embodiment, the pin receiving passageway 40 has a hook shape, but may have other shapes in which the releasing portion 42 and retaining portion 44 are in communication with one another, as understood by those skilled in the art.

The manual harpoon 20 further illustratively includes a harpoon tip 50 having an open proximal end 52 for being received over the distal end 34 of the shaft 30. A pin 60 is illustratively carried by the open proximal end 52 of the harpoon tip 50 and cooperates with the pin receiving passageway 40 to retain the harpoon tip 50 on the shaft 30 when the pin is in the retaining portion 44 of the pin receiving passageway (FIG. 4). The pin 60 also cooperates with the pin receiving passageway 40 to release the harpoon tip 50 from the shaft 30 when the pin is in the releasing portion 42 of the pin receiving passageway. The harpoon tip 50, the pin 60, and the spring 65 may define a harpoon tip assembly.

Figure 3:
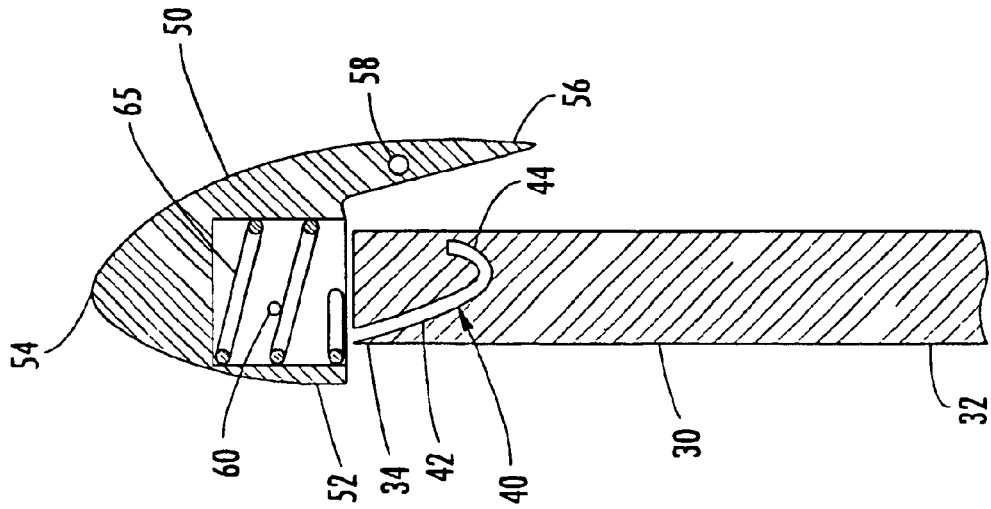
FIG. 3 is a cross-sectional view taken through line 3—3 of FIG. 2.

FIG. 3 illustrates the harpoon tip 50 before being connected to the shaft 30, or alternatively, after it has been released from the shaft. FIG. 4 illustrates the harpoon tip 50 after the pin 60 has been positioned to cooperate with the retaining portion 44 of the pin receiving passageway 40 to retain the harpoon tip in the shaft 30. To release the harpoon tip 50 from the shaft 30, a forward pressure is applied to the harpoon tip to thereby move the pin 30 from the retaining portion 44 and into the releasing portion 42. When in the releasing portion 42 of the pin receiving passageway 40, there is no obstruction to the pin and, accordingly, the harpoon tip 50 may be readily released from the shaft 30. The releasing portion 42 and the retaining portion 44 of the pin receiving passageway 40 advantageously allow for simplified use of the manual harpoon 20. Further, the configuration of the pin 60 cooperating with the pin receiving passageway 40 advantageously allows for the harpoon tip 50 to be readily reused.

The manual harpoon 20 also illustratively includes a spring 65. The spring 65 is within the harpoon tip 50 and mounts the pin 60 in the open proximal end 52 of the harpoon tip. The spring 65 is connected to an interior portion of the open proximal end 52 of the harpoon tip 50, and may be a coil spring having an axis that is aligned with an axis of the open proximal end of the harpoon tip. The pin 60 illustratively extends transversely through a medial portion of the coil spring. The spring 65 advantageously allows the pin 60 to move transversely to align with the pin receiving passageway 40 so that the pin may move from the releasing portion 42 to the retaining portion 44 thereof. Further, the spring 65 also provides a predetermined amount of force when the pin 60 is in the retaining portion 44 to retain the harpoon tip 50 on the shaft 30.

The manual harpoon 20 further illustratively comprises a connector 70 for connecting the handle 22 to the shaft 30. More specifically, the connector 70 connects the distal end 26 of the handle 22 to the proximal end 32 of the shaft 30. The connector 70 includes a connecting tab 72 that extends from a proximal end 74 thereof. The handle 22 illustratively includes a connecting tab receiving passageway 28 formed in the distal end 26 thereof for receiving the connecting tab 72 to thereby connect the distal end 26 of the handle 22 to the proximal end 74 of the connector 70.

The connector 70 is illustratively a threaded connector, and the proximal end 32 of the shaft 30 is threaded to receive the threaded connector. More specifically, a distal end 76 of the connector 70 illustratively includes a threaded passageway 78 so that the threaded proximal end 32 of the shaft 30 may receive the threaded passageway. The connector 70 advantageously provides a secure connection between the handle 22 and the shaft 30 so that a user may reliably use the harpoon 20 without the shaft 30 inadvertently coming apart from the handle.

The connector 70 may advantageously be interchangeable with many different shafts 30 so that a plurality of shafts having harpoon tips 50 connected thereto may be connected to one handle 22. In other words, a plurality of harpoon tips 50 may be released into a plurality of targets without the need to take the time to reattach the harpoon tip to the shaft 30.

The harpoon tip 50 illustratively comprises a distal sharpened end 54 and a proximal sharpened barb 56 extending rearwardly therefrom. The distal sharpened end 54 advantageously allows for the harpoon tip 50 to readily penetrate a target. An alligator, for example, has a very thick and tough hide and, accordingly, a harpoon tip 50 having a sharpened distal end 54 is advantageous when hunting such animals. The proximal sharpened barb 56 advantageously aids in ensuring the harpoon tip 50 remains within the target after having been inserted therein.

The harpoon tip 50 illustratively has an opening 58 therein, and a harpoon line 45 having a first end 46 is illustratively connected to the opening. The harpoon line 45 may, for example, be rope, or any other type of line as understood by those skilled in the art. A buoy 48 is connected to a second end 47 of the harpoon line 45. The buoy 48 advantageously allows the user to track the location of the target after the harpoon tip 50 as been inserted therein. Another advantage of the buoy 48 is that it may drain energy from the target when connected thereto via the harpoon tip. In other words, when using the manual harpoon 20 to hunt alligator, the drag of the buoy 48 may cause the alligator to tire and therefore, be less aggressive.

The handle 22 illustratively has a circular outer surface 36, or any other shape as understood by those skilled in the art. The outer portion of the handle 22 may comprise an aluminum tube, for example. Material 38, such as foam, is within the tube to thereby advantageously provide a lightweight manual harpoon 20. The material 38 is preferably low in density so that the handle 22 of the manual harpoon 20 advantageously floats if inadvertently dropped in water, for example. Those skilled in the art will understand that the outer portion of the handle 22 may be any lightweight material, and the material 38 within the outer housing may be any lightweight, low density material.

The shaft 30 and the harpoon tip 50 may each comprise stainless steel. Any other material that is light in weight, high in strength, and not prone to corrosion may also be suitable, as understood by those skilled in the art.

Figure 6:
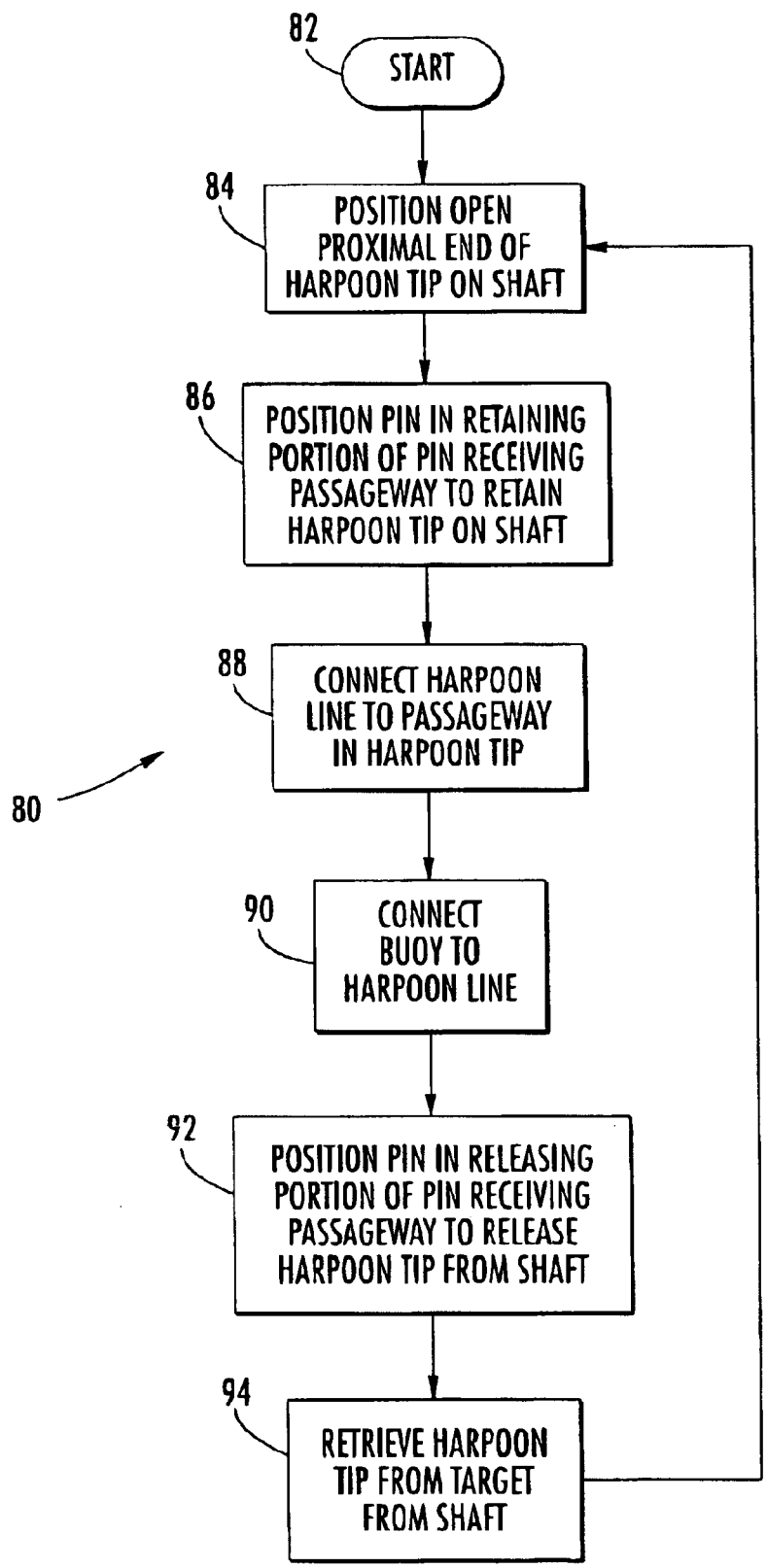
FIG. 6 is a flow chart illustrating a method of using the harpoon according to the present invention.

Referring now additionally to the flow chart 80 of FIG. 6, a method of using the manual harpoon 20 is now described. From the start (Block 82), the open proximal end 52 of the harpoon tip 50 is positioned on the shaft 30 at Block 84. At Block 86, the pin 30 is positioned in the retaining portion 44 of the pin receiving passageway 40 to retain the harpoon tip 50 on the shaft 30. The harpoon line 45 is connected to the opening 58 in the harpoon tip 50 at Block 88. At Block 90, the buoy 48 is connected to the harpoon line 45, and at Block 92, the pin 60 is moved from the retaining portion 44 to the releasing portion 42 of the pin receiving passageway 40 to release the harpoon tip 50 from the shaft 30. At Block 94, the harpoon tip 50 is retrieved from the target, e.g., the hide of the alligator A. After retrieving the harpoon tip 50 from the target at Block 94, it may again be received on the shaft 30 at Block 84.

A manual harpoon 20 is described in detail above, but those skilled in the art will understand that the harpoon may be delivered by other means, such as an explosive gas, for example. Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

What is claimed is:

1. A harpoon comprising:
   a shaft having a distal end and a pin receiving passageway formed in the distal end, the pin receiving passageway having a hook shape and including a releasing portion and a retaining portion in communication therewith;
   a harpoon tip having an open proximal end for being received over the distal end of said shaft;
   a pin carried by the open proximal end of said harpoon tip and cooperating with the pin receiving passageway to retain said harpoon tip on said shaft when said pin is in the retaining portion of the pin receiving passageway, and to release said harpoon tip from said shaft when said pin is in the releasing portion of the pin receiving passageway; and
   a spring mounting said pin in the open proximal end of said harpoon tip.

2. A harpoon according to claim 1 wherein said spring comprises a coil spring having an axis aligned with an axis of the open proximal end of said harpoon tip; and wherein said pin extends transversely through a medial portion of said coil spring.

3. A harpoon according to claim 1 further comprising a handle to be grasped by a user for placing the manual harpoon; wherein said shaft has a proximal end; and further comprising a connector for connecting said handle to the proximal end of said shaft.

4. A harpoon according to claim 3 wherein said handle comprises an aluminum tube and foam material therein.

5. A harpoon according to claim 1 wherein said harpoon tip comprises a distal sharpened end and a proximal sharpened barb extending rearwardly therefrom.

6. A harpoon according to claim 1 wherein said harpoon tip has an opening therein; and further comprising a harpoon line having a first end connected to the opening.

7. A harpoon according to claim 6 further comprising a buoy connected to a second end of said harpoon line.

8. A harpoon according to claim 1 wherein said shaft and said harpoon tip each comprises stainless steel.

9. A manual harpoon comprising:
   a handle to be grasped by a user for placing the manual harpoon;
   a shaft having a proximal end connected to said handle, and a distal end having a pin receiving passageway formed therein, the pin receiving passageway having a hook shape and including a releasing portion and a retaining portion in communication therewith;
   a harpoon tip having an open proximal end for being received over the distal end of said shaft;
   a pin carried by the open proximal end of said harpoon tip and cooperating with the pin receiving passageway to retain said harpoon tip on said shaft when said pin is in the retaining portion of the pin receiving passageway, and to release said harpoon tip from said shaft when said pin is in the releasing portion of the pin receiving passageway; and
   a spring mounting said pin in the open proximal end of said harpoon tip.

10. A manual harpoon according to claim 1 wherein said spring comprises a coil spring having an axis aligned with an axis of the open proximal end of said harpoon tip; and wherein said pin extends transversely through a medial portion of said coil spring.

11. A manual harpoon according to claim 9 further comprising a connector for connecting said handle to said shaft.

12. A manual harpoon according to claim 9 wherein said harpoon tip comprises a distal sharpened end and a proximal sharpened barb extending rearwardly therefrom.

13. A manual harpoon according to claim 9 wherein said harpoon tip has an opening therein; and further comprising a harpoon line having a first end connected to the opening.

14. A manual harpoon according to claim 13 further comprising a buoy connected to a second end of said harpoon line.

15. A manual harpoon according to claim 9 wherein said handle comprises an aluminum tube and foam material therein.

16. A manual harpoon according to claim 9 wherein said shaft and said harpoon tip each comprises stainless steel.

17. A harpoon tip assembly comprising:
   a harpoon tip having an open proximal end;
   a pin carried by the open proximal end; and
   a coil spring mounting said pin in the open proximal end, and having an axis aligned with an axis of the open proximal end;
   said pin extending transversely through a medial portion of said coil spring.

18. A harpoon tip assembly according to claim 17 wherein said harpoon tip comprises a distal sharpened end and a proximal sharpened barb extending rearwardly therefrom.

19. A harpoon tip assembly according to claim 18 wherein said harpoon tip comprises stainless steel.

20. A harpoon tip assembly according to claim 17 wherein said harpoon tip has an opening formed therein for receiving a harpoon line therethrough.

21. A method for using a harpoon comprising:
   positioning an open proximal end of a harpoon tip over a distal end of a shaft having a hook shaped pin receiving passageway formed therein;
   retaining the harpoon tip on the shaft when a pin carried by the open proximal end of the harpoon tip is in a retaining portion of the pin receiving passageway, wherein a spring mounts the pin in the open proximal end of the harpoon tip; and
   releasing the harpoon tip from the shaft when the pin is in a releasing portion of the pin receiving passageway.

22. A method according to claim 21 further comprising connecting a proximal end of the shaft to a handle.

23. A method according to claim 21 further comprising connecting a first end of a harpoon line to the harpoon tip.

24. A method according to claim 23 further comprising connecting a buoy to a second end of the harpoon line.

* * * * *